W. Q. GLASS.
LAWN EDGING TOOL.
APPLICATION FILED OCT. 7, 1913.
1,113,984.
Patented Oct. 20, 1914.
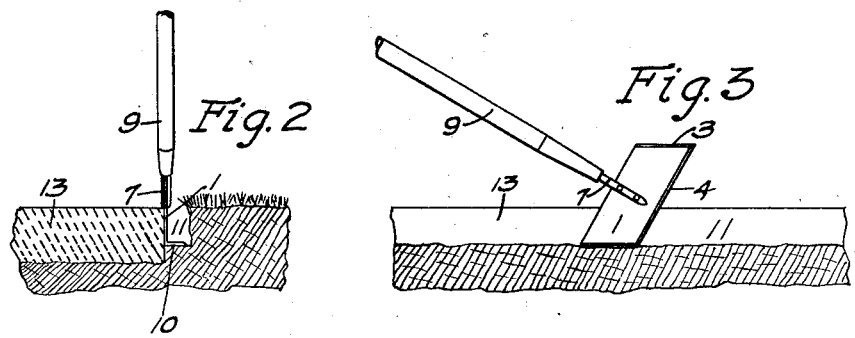
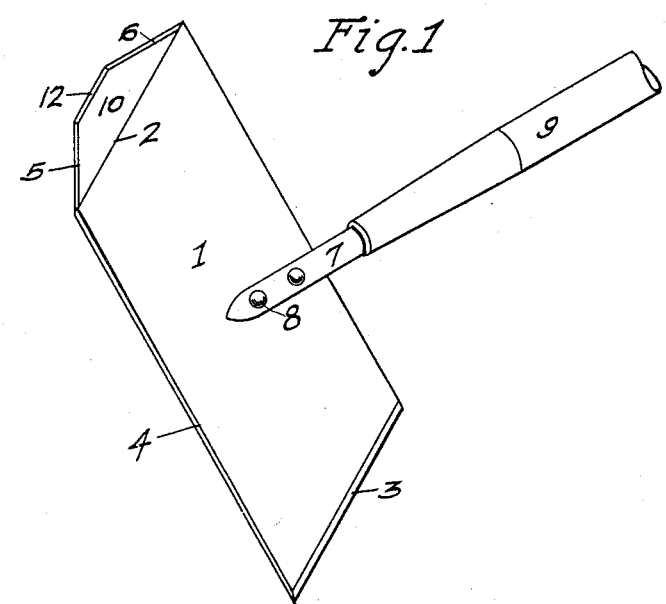
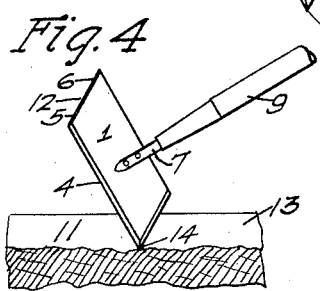
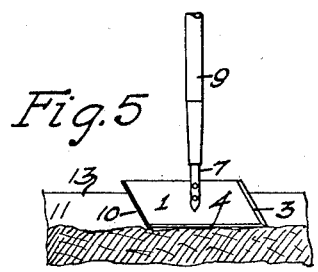
Witnesses,
Inventor,
WILLIAM Q. GLASS.
By
His Attorney.

UNITED STATES PATENT OFFICE.

WILLIAM Q. GLASS, OF LONG BEACH, CALIFORNIA.

LAWN-EDGING TOOL.

1,113,984.  Specification of Letters Patent.  Patented Oct. 20, 1914.

Application filed October 7, 1913. Serial No. 793,853.

*To all whom it may concern:*

Be it known that I, WILLIAM Q. GLASS, a citizen of the United States, residing at Long Beach, in the county of Los Angeles and State of California, have invented a new and useful Lawn-Edging Tool, of which the following is a specification.

My invention relates to improvements in lawn edging tools, and the object of my invention is to provide a tool for ditching and edging a lawn along the edge of a side walk and for trimming the grass away from the walk.

Other objects may appear in the subjoined detailed description and specification.

I attain this object by means of the mechanism illustrated in the accompanying drawings, in which—

Figure 1 is a perspective view of my device. Fig. 2 is a lateral cross section of a walk and the edge of a lawn with my device in position in the ditch. Fig. 3 is a longitudinal section through the ditch and a side elevation of Fig. 2. Fig. 4 is a view similar to Fig. 3 but showing my device in a different position and for another use. Fig. 5 is a view similar to Figs. 3 and 4 with my device in still another position and for another use.

The same reference numerals refer to like parts throughout the specifications.

I am aware of numerous tools in common use for the purpose herein set forth but I am not aware that any tool involving the features or improvements of my device have ever been used or patented.

The blade 1 has the main flat base in the form of a parallelogram, the ends 2 and 3 having an acute angularity with respect to a line coincident with the front edge 4, one of these edges being beveled to form a cutting edge and the other end being upwardly bent at right angles to the base and having two angular cutting edges 5 and 6 and a third cutting edge parallel to the base. The front edge of the base as at 4 is also beveled to form a cutting edge, and to the base near its center is secured the stem 7 by means of the rivets 8, or the stem may be secured thereto in any other suitable manner, and the stem may be slotted as shown in Fig. 2 and the base secured in the slot, this method being preferable, as the leverage exerted in the use of the tool may not then break the rivets 8 loose from the base. The handle 9 may be pressed on the stem 7 or otherwise secured to it.

The angularity of the edges 2 and 3 is of such convenience that the handle 9 may be easily pushed by the operator and that the upturned edge 10 may rest flatly upon the bottom of the ditch 11 as shown in Figs. 2 and 3, and when in this position, the edges 5, 6 and 12 on the end 10 will serve to clear the ditch of any grass or dirt which may have accumulated on the bottom while the edge 4 of the blade 1 which presents an angular cutting edge, will similarly clear and cut the grass from the sides of the ditch. A ditch 11 is commonly used at the edge of a side walk 13 for giving the edge of the lawn an appearance of neatness, and for preventing the grass from overlapping the walk, and it is necessary to frequently clean the ditch to prevent its filling and becoming overgrown with grass and weeds, and it is therefore for this purpose that this tool is designed.

As shown in Fig. 4, the tool may be inverted and the point 14 used to advantage to cut away a particularly stubborn or tough tuft of grass or to cut the dirt on the edge of the ditch to a nicety, or by placing the straight edge 4 on the bottom of the ditch, the tool may be drawn along the ditch for similar or other convenient or desirable purposes. The angular edges on the base and the upturned portion 10 provide a more easy and convenient means of cutting than a straight edge would, and the end 10 also serves to determine the width of a ditch when it is made as well as to assist in keeping the tool at the proper cutting angle when pushed along the edge of the walk in the ditch, and furthermore two cutting edges at right angles to each other when so used serve to expedite and insure a neat trimming of the bottom and side of the ditch at the same time.

In general my device is intended to answer the purpose of a general utility tool for lawn work and may be conveniently used in many ways not described, and its form may be changed without changing the intent of or without detracting from its novelty.

Having thus described my device what I claim as my invention and desire Letters Patent for, is:

1. As a tool for trimming and ditching the edge of a lawn, the combination with a suitable handle, of a blade secured to said handle having the shape of a parallelogram at the base thereof, a cutting edge on the front of said base substantially at right angles to said handle, a cutting edge on one end of said base at an acute angle to said front edge, and an upturned end at the other end of said base having a cutting edge parallel to the base and a diagonal cutting edge at each side of said upturned portion extending from the edge thereof to the base, as described.

2. As a tool for trimming and edging a lawn, the combination of a blade having cutting edges on two of its sides, and one of said edges being at an angle acute to the other, and one end of said blade having the form of a trapezoid being bent upwardly to form an auxiliary cutting edge at right angles to said blade, and a handle secured to said blade at right angles to the front edge thereof, as described.

WILLIAM Q. GLASS.

Witnesses:
ANNE HARTENSTEIN,
J. D. HASKIN.

Copies of this patent may be obtained for five cents each, by addressing the "Commissioner of Patents, Washington, D. C."